United States Patent [19]

Schumm

[11] 3,949,850
[45] Apr. 13, 1976

[54] SPOUT CONSTRUCTION FOR GRAIN ELEVATORS AND THE LIKE

[76] Inventor: H. Dale Schumm, 1323 Briarwood, Albert Lea, Minn. 56007

[22] Filed: Nov. 7, 1974

[21] Appl. No.: 521,845

[52] U.S. Cl. .................................. 193/25 E; 193/16
[51] Int. Cl.² ......................................... B65G 11/10
[58] Field of Search .............. 193/1, 2 R, 2 A, 3, 4, 193/5, 6, 9, 14, 16, 22, 23, 25 E, 25 C, 30, 25 R; 302/60, 63, 64; 138/118, 119, 120, 155, DIG. 7; 85/5 CP, 8.3

[56] References Cited
UNITED STATES PATENTS

| | | | |
|---|---|---|---|
| 1,185,459 | 5/1916 | Worley | 138/120 |
| 1,981,413 | 11/1934 | Goodfellow | 138/120 X |
| 2,399,119 | 4/1946 | Howell | 85/8.3 |
| 2,772,764 | 12/1956 | McClellan | 193/25 E X |
| 2,997,150 | 8/1961 | Emanuelson | 193/25 E |
| 3,011,612 | 12/1961 | Olsen | 193/22 |
| 3,379,219 | 4/1968 | Schuh | 302/64 X |
| 3,669,503 | 6/1972 | Zimmermann | 302/64 |
| 3,709,345 | 1/1973 | Price | 193/34 |
| 3,797,625 | 3/1974 | Price | 193/34 |
| 3,807,540 | 4/1974 | Boulet | 193/25 E X |

FOREIGN PATENTS OR APPLICATIONS

| | | | |
|---|---|---|---|
| 557,860 | 5/1968 | Canada | 85/5 CP |
| 1,287,370 | 1/1969 | Germany | 85/5 CP |

OTHER PUBLICATIONS

"Rigid Urethane Foam", DuPont Corp., Wilmington, Del., 1962, pp. 5 and 6.

Primary Examiner—Evon C. Blunk
Assistant Examiner—James L. Rowland
Attorney, Agent, or Firm—McDougall, Hersh & Scott

[57] ABSTRACT

A spout construction of the type used in association with grain elevators and the like. The construction comprises an assembly of interfitting tubular sections with chains extending along the length of the assembly. Each tubular section comprises a tapered body composed of polyurethane with integrally formed shoulder portions around the wide upper end of each section. Supporting rings engage the shoulder portions, and releasable clip means are utilized for attaching the chains. The position of the exit end of the assembly can be adjusted by shortening the length of chain between adjacent rings, and a spring clip construction is employed to facilitate this adjustment.

3 Claims, 7 Drawing Figures

U.S. Patent  April 13, 1976  3,949,850
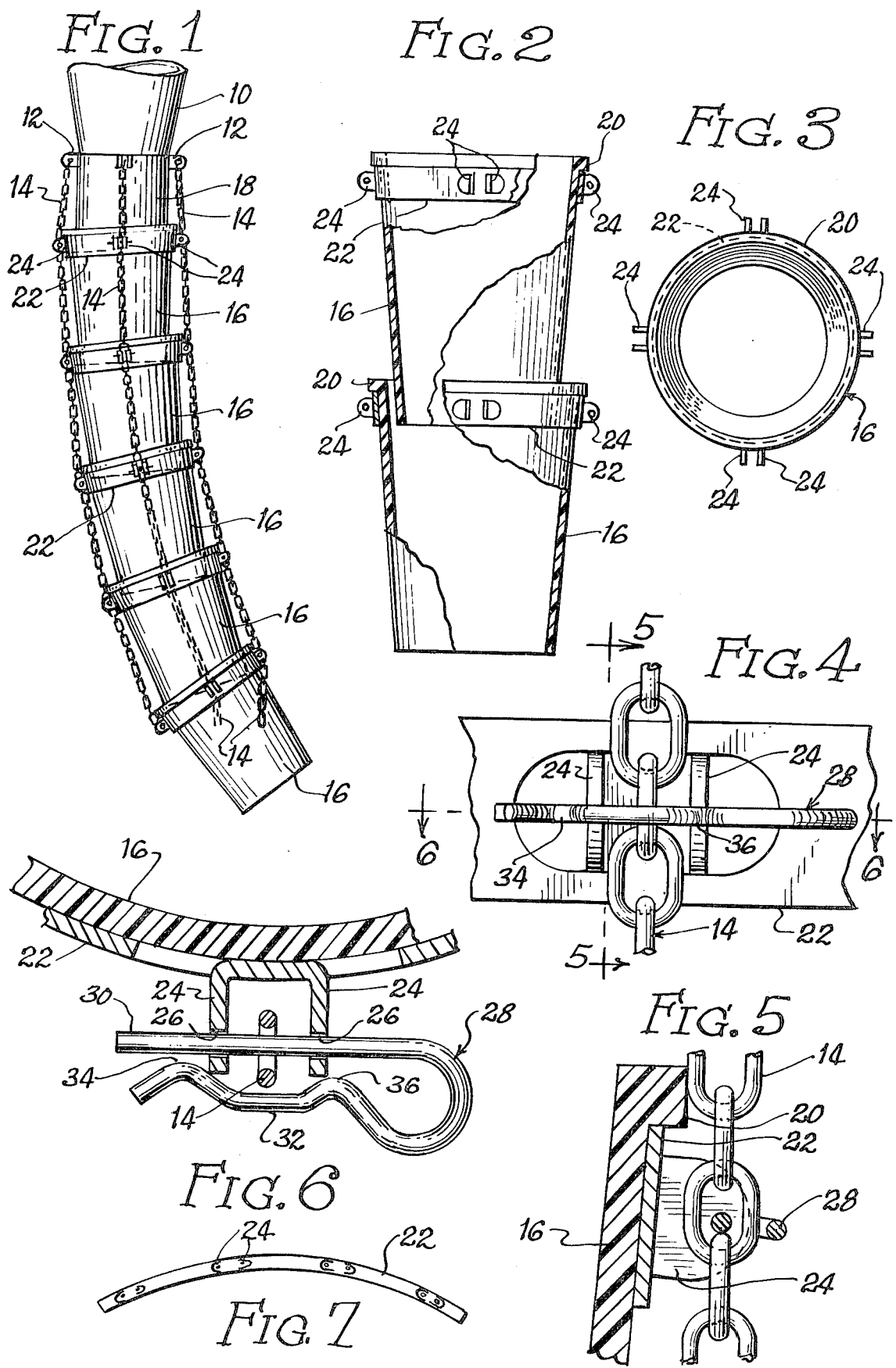

SPOUT CONSTRUCTION FOR GRAIN ELEVATORS AND THE LIKE

This invention is directed to a grain spout construction of the type typically used in association with a grain elevator.

In grain elevators and the like, it is necessary to provide means for discharging the contents of the elevator. In a typical situation, a railroad car or truck will be located adjacent an elevator. A grain spout is employed for directing the contents of the elevator into the car or truck.

In accordance with known grain spout designs, for example as shown in Emanuelson U.S. Pat. No. 2,997,150, the grain spout is formed from a plurality of interfitting sections. Chains are employed for interconnecting the respective sections, and these chains also serve as a means for adjusting the discharge position of a spout.

The discharge position of a spout is of importance, particularly where the railroad car or truck is relatively large. In such case, it is desirable to direct the contents of the elevator to one portion of the vehicle until this portion has been substantially filled. The spout is then redirected to a separate portion and so on until the discharging operation has been completed.

It is not desirable, and in the case of large spouts, not practical, to utilize workmen for directing a spout during a loading operation. For this reason, spouts such as shown in the Emanuelson patent are designed with chains and associated structural elements so that the discharge direction of a spout can be controlled. More particularly, the spout is designed so that the lengths of chains extending between adjacent spout sections can be shortened thereby imparting an arcuate shape to the spout. By manipulating the chains in this fashion, a spout extending outwardly from an elevator can be disposed for discharging the contents of the elevator in several different locations. Structures of this type require workmen only for purposes of adjusting the spout discharge direction a few times during a given loading operation, and workmen are not required to give continuous attention to maintaining the spout discharge at a particular location.

Prior art spout designs have been found to suffer from certain deficiencies from the standpoint of efficient operation. In particular, certain spout designs are quite inconvenient from the standpoint of adjustments of the spout direction. Furthermore, it has been found that existing designs are subject to considerable wear whereby relatively frequent replacement of an entire spout or sections thereof can be required. Finally, damage to grain handled by the spouts is a fairly common occurrence.

It is a general object of this invention to provide an improved design for grain spouts utilized in association with grain elevators.

It is a more specific object of this invention to provide an improved grain spout construction which is particularly characterized by improved operating life.

It is a still further object of this invention to provide a grain spout construction which is of a relatively straightforward design whereby the construction can be efficiently manufactured and also utilized in an efficient manner.

These and other objects of this invention will appear hereinafter and for purposes of illustration but not of limitation, specific embodiments of the invention are shown in the accompanying drawings in which:

FIG. 1 is an elevational view of a spout construction characterized by the features of this invention;

FIG. 2 is an enlarged elevational view, partly cut away, of spout sections characterized by the features of the invention;

FIG. 3 is a plan view of the structure shown in FIG. 2;

FIG. 4 is an enlarged fragmentary view illustrating the ring and clip structure which characterizes the invention;

FIG. 5 is a vertical sectional view taken about the line 5—5 of FIG. 4;

FIG. 6 is a horizontal sectional view taken about the line 6—6 of FIG. 4; and,

FIG. 7 is a plan view of a blank utilized for forming the spout supporting rings.

This invention generally relates to a spout construction for grain elevators and the like wherein the construction comprises an assembly of interfitting tubular sections. The invention is particularly concerned with grain spouts of the type having one or more chains extending along the assembly of interfitting sections. In such constructions, the chains are employed for holding the sections in an assembly and are also utilized for controlling the discharge position of a given spout.

In spout constructions of the type referred to, the discharge direction is controlled by controlling the lengths of chains between adjacent spout sections. Specifically, by shortening the lengths of chain along one side of a spout section, a curvature is imparted so that the spout discharge end will be repositioned and can, therefore, be employed for loading different areas of a railroad car or the like. In a typical loading operation, a workman might adjust the chain lengths three or four times so that the spout discharge location can be varied from one end of a car to the other. The aforementioned Emanuelson patent illustrates a structure of the type referred to.

In accordance with the concepts of this invention, an improved spout construction is provided by employing tubular sections formed of polyurethane. These tubular sections are designed for use in association with unique ring members which serve to support the individual tubular sections. Shoulders are integrally formed in the polyurethane tubular sections, and these shoulders provide the means for supporting the individual sections relative to the rings.

The ring structures include tabs which extend outwardly so that chains extending along the length of an assembly of tubular sections are located adjacent the tabs. Spring clips are adapted to be received by openings in the tabs for purposes of securing the individual chains relative to the tubular sections. These chains serve to hold the assembly of tubular sections together, and by reason of the clip structure, these chains also serve to control the discharge position of the spout as explained above.

The accompanying drawings illustrate a particular spout assembly characterized by the features of this invention. Referring to FIG. 1, an outlet 10 of the type normally associated with a grain elevator is illustrated. This outlet carries a plurality of ears 12 which are provided for securing the upper ends of chains 14.

A first tubular section 16 defines a wide upper end adapted to receive the lower end of the straight section 18 formed in the outlet 10. The lower end of the tapered spout section is in turn received within the upper end of the next spout section 16, and an interfitting relationship of the spout sections is, therefore, accomplished.

As best shown in FIG. 2, the upper end of each spout section defines an outwardly extending shoulder 20. The spout sections are formed of polyurethane, and this greatly facilitates the formation of the shoulder 20 since this shoulder can be molded integrally with the tapered body of the spout section.

A plurality of supporting rings 22 are employed for supporting the individual spout sections. As best shown in FIG. 2, the shoulders 20 rest directly on the rings 22. With this arrangement, assembly of the spout sections into a completed spout contruction is accomplished with ease.

The rings are formed from a blank as shown in FIG. 7. These blanks are stamped to provide tabs 24, and these tabs are then bent outwardly as best shown in FIG. 3 so that pairs of spaced apart tabs can be formed at desired locations on the ring. The blank shown in FIG. 7 is employed where four sets of tabs as shown in FIGS. 1 through 3 are to be utilized. It will be understood that this invention contemplates the provision of at least two sets of tabs, and this arrangement is satisfactory where the desired discharge positions of a spout are somewhat limited. The provision of four chains, in addition to providing a stronger structural arrangement also provides more versatility from the standpoint of spout discharge positions.

The tabs are designed so that a standard chain configuration can be located between the tabs as shown in FIG. 4. The tabs are provided with openings 26, and attaching clips 28 are associated with these openings for purposes of attaching the chain lengths to the rings. As best shown in FIG. 6, the clips 28 are of circular cross section and comprise a straight portion 30 and an irregularly shaped portion 32. The curved areas 34 and 36 of this irregularly shaped section permit secure positioning of the clips relative to the tabs 24. Specifically, when a link of a chain 16 is located as shown in FIGS. 4 and 6, the clip portion 30 is inserted through one hole 26, and then forced inwardly. The end 34 is then forced over one tab 24 and then over the second tab as the portion 30 is moved through the other opening 26.

As noted, the attitude of the spout can be changed for varying the discharge location of the spout. This is accomplished by shortening the length of chain extending between adjacent rings. The clip structure 28 is uniquely suitable for accomplishing this since this clip structure can be readily removed and replaced. For example, pliers are conveniently used for pulling a clip out from the position shown in FIG. 6, and the clip can be forced in manually or with only small mechanical assistance.

The spout design is, as noted, of a relatively straightforward nature whereby manufacture and assembly as well as use is efficiently accomplished. The polyurethane tubular sections can be readily molded in accordance with standard techniques, and the fact that the shoulders 20 are formed integrally in the molding operation provides a highly convenient design feature. Thus, the support for the individual tubular sections is automatically provided by these shoulders which are quite easily formed with the tubular sections.

The ring sections 22 are also manufactured in an exceedingly efficient manner. In this connection, the blanks shown in FIG. 7 are curved as illustrated so that a taper corresponding with the taper of the tubular polyurethane sections is automatically formed in the rings. The ends of the blanks are secured together by means of welding or other conventional technique when forming the rings. When assembling a spout, the tubular sections are simply dropped through the rings, and the chains attached by means of the releasable clips 28. In this connection, it will be appreciated that if any spout sections revealed excessive wear, the illustrated construction permits rotation of the sections relative to associated rings whereby the wear can be very evenly divided.

Applicant's use of polyurethane has been found to significantly reduce maintenance problems with spouts since significantly increased operating life results. Furthermore, the polyurethane has been found to be much more compatible with the handling of grain in that damage to the grain is substantially reduced when compared with damage occurring in standard metal spouts. A polyurethane composition having a Shore D hardness between 50 and 75 has been found to be particularly suitable for achieving these advantageous results.

It will be understood that various changes and modifications may be made in the above described construction which provide the characteristics of the invention without departing from the spirit thereof particularly as defined in the following claims.

That which is claimed is:

1. In a spout construction for use in association with grain elevators and the like, said construction comprising an assembly of interfitting tubular sections with chains extending along the assembly for interconnecting the sections, the improvement wherein said sections are composed of polyurethane characterized by a Shore D hardness between 50 and 75, and comprise integrally molded tapered body portions having a wide upper end and a narrower lower end with integrally molded outwardly extending shoulder portions formed at said upper end, and supporting rings located adjacent the upper end of each tubular section, said shoulders each nesting on a ring, said rings being formed from initially flat, curved strips of metal whereby bending of the strips to form a receiving opening for the tubular sections results in tapered rings fitting in surface-to-surface relationship against the tapered outer surfaces of the tubular sections, tab means formed in said rings for attachment of said chains thereto, said tab means comprising portions of said metal strips bent outwardly from the strips, releasable attaching means for use in attaching said chains, said attaching means comprising clips, said tabs comprising spaced apart tabs with said chains extending between pairs of tabs, and openings defined by said tabs, said clips including a portion extending through said openings and through at least one link of a chain.

2. A construction in accordance with claim 1 wherein said clips comprise spring clips including a first leg extending through said openings and said link, and a second leg adapted to be forced over the exterior edges of said tabs, said clips being adapted to release said chains by pulling of said portion of said clips out of said openings.

3. A construction in accordance with claim 1 wherein at least two chains extend in spaced apart relationship along the length of said assembly, the assembly being bendable into an arc upon shortening of one or more lengths of chain extending between adjacent rings.

* * * * *